UNITED STATES PATENT OFFICE.

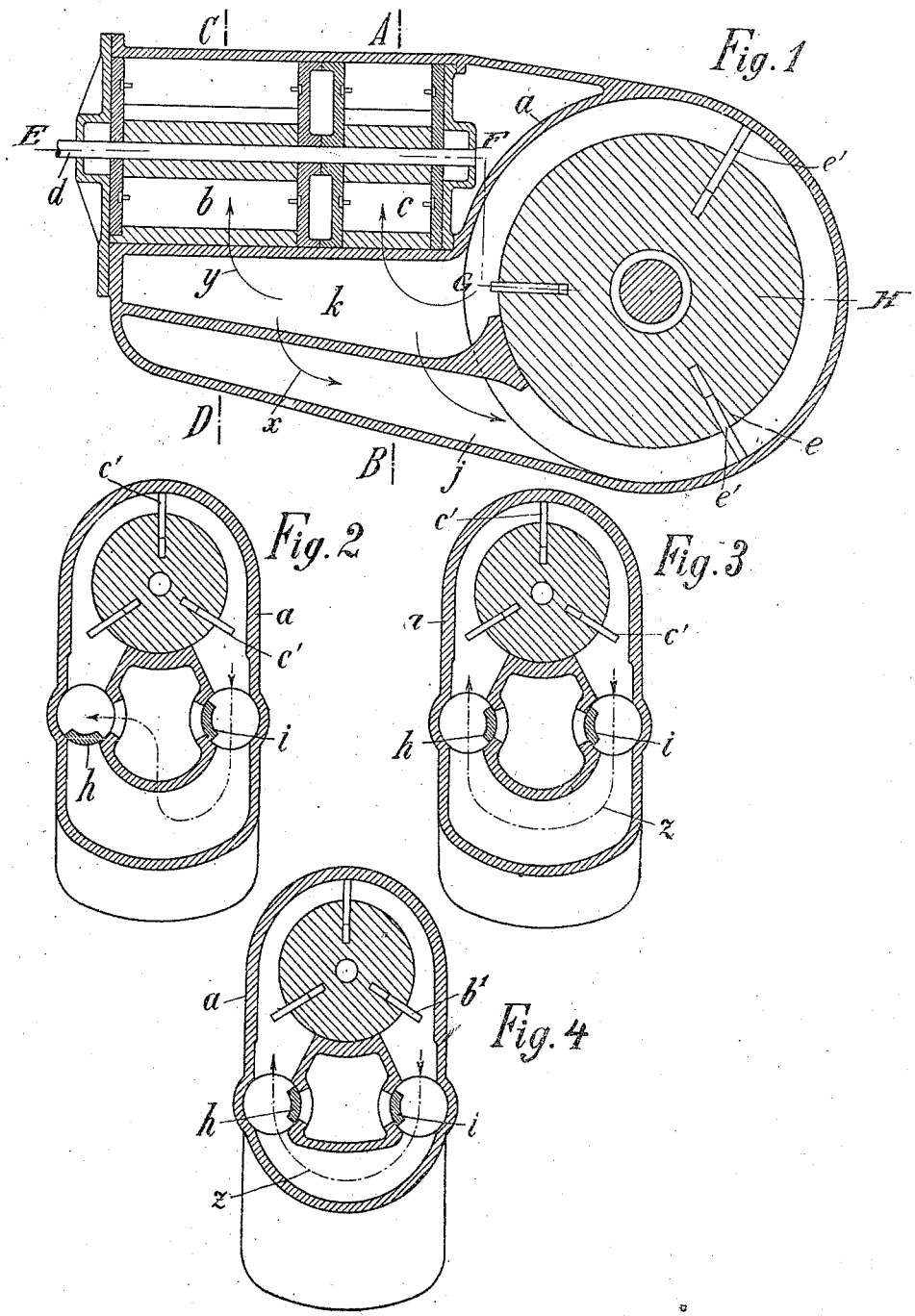

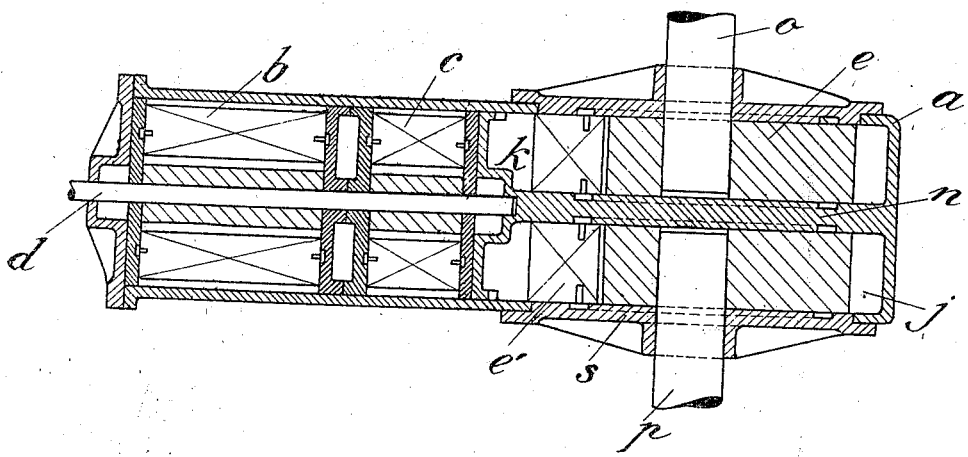

HUGO LENTZ, OF GRUNWALD, NEAR BERLIN, GERMANY.

FLUID TRANSMISSION-GEAR.

1,106,390.

Specification of Letters Patent. Patented Aug. 11, 1914.

Application filed May 23, 1911. Serial No. 629,041.

*To all whom it may concern:*

Be it known that I, HUGO LENTZ, a subject of the German Emperor, residing at Grunwald, near Berlin, Germany, have invented a new and useful Fluid Transmission-Gear; and I do hereby declare the following to be a full, clear, and exact description of the same.

The present invention relates to a form of fluid transmission gear which is novel and exceedingly simple in construction, and in which there is a minimum of resistance to the propelling fluid, and consequently a large efficiency.

In fluid transmission gears, of all kinds, it is of the greatest importance to prevent, as far as possible, changes in direction of flow of the propelling liquid, in order that the efficiency shall be maintained at the highest possible. It is well recognized that every change in direction of the fluid, means proportionately loss of its energy, which loss is further increased owing to the fact that almost every change in direction is accompanied by an alteration in the cross-section. A further desideratum for efficient transmission of power, is the prevention of the division of the stream of liquid into several parts, such division being highly disadvantageous. In addition, and especially in the propulsion of vehicles, the question of economy must be carefully studied. Because of the omission or neglect of one or more of said principal conditions, no type of fluid transmission gear has heretofore been devised, which could, with any reasonable degree of success be applied to vehicles. While it is exceedingly difficult to combine all these advantages into one simple structure, and especially in a form wherein the axis of the pump is at an angle with respect to that of the motor, I have accomplished the same by means of the arrangement illustrated in the accompanying drawings and hereinafter described.

The desired result is brought about by a new method of admission of the pumped liquid to the pump as well as to the motor or motors to be driven thereby and constituting the differential gear; in the provision of a new arrangement of two controlling members or valves, and also in a new arrangement of pressure and suction chambers or canals. As a result, not only are the shortest canal guides avoided, but also there is assured the avoidance of all, but one, of the disadvantageous changes of direction of the fluid. This unavoidable change in direction is due, in the instance illustrated, to the fact that the pump is perpendicular to the motor constituting the differential. By my new arrangement, every division of the stream of liquid is avoided.

The characteristics of the present invention, especially in the illustrated form, are the employment of one-sided admission pumps and motors whose axes are perpendicular to each other, with two controlling valves arranged symmetrically to a vertical plane passing through the axis of the pump and movable parallel, or approximately so, to said axis, and with two canals (either of which may be used as the suction chamber while the other is used as the pressure chamber) preferably one above the other. The construction and control of and by such valves is claimed and more fully described in my co-pending application, Serial Number 628,594, and known as Series XXXV.

Referring to the accompanying drawing, which illustrates one example of my invention, Figure 1 is a longitudinal section of a gear embodying my present improvements; Fig. 2 illustrates a section at B—A of Fig. 1; Fig. 3 illustrates a like section with a valve *h* in a different position; Fig. 4 is a view, illustrating a section at D—C of Fig. 1; Fig. 5 shows a section on the line E—F—G—H of Fig. 1.

Upon examination of Fig. 1, it shows a casing *a*, containing a plurality (two) of pressure pumps *b* and *c*, one having a larger capacity than the other, and a motor *e*. The two pumps are mounted in series upon a shaft *d*, to be driven together by an explosion or other engine (not shown). The axis of rotation of the pumps is perpendicular to or at a right angle relatively to the axis of rotation of motor *e*. If desired, there may be two or more motors *e* on the same shaft or revolving around the same axis, as shown in Fig. 5, which shows two pistons *e*, which carry the vanes *e'* in radial slots, which vanes are moved by means of guide rollers. These rollers run with their heads in lateral curved grooves *r*, which are provided on one side in the covers *s*, and on the other side in the central wall. The pistons *e* are mounted upon the rear wheel axles *o* and *p* of the power vehicle. The casing has two chambers or canals, a pressure chamber *j*, at the bottom of the casing, and a suction chamber $k$ above it. Parallel with the pump axis, $d$, and symmetrical with a vertical plane through this, there are two controlling valves $h$, $i$, the latter of which consists of as many parts (valves) as there are pumps ($b$ and $c$), so that each pump can be rendered individually effective or ineffective upon the motor $e$. The pumps, and also the motor, are each acted upon by the liquid on one side only. Three functions come into consideration, in familiar manner, for the propelling liquid (oil, in this instance). These are (1) the no-load function, (2) the pressure function, and (3) the suction function.

The following requirements may be laid down for a correctly and economically operating hydraulic gear. If a pump is rotated, the liquid must be so conducted that its course is self-inclosed and only the smallest possible resistance opposes the starting; otherwise the passage of the oil through many curves and contractions, would mean too great resistance and render difficult the rotation of the motor.

As appears from Fig. 3, the oil, in its no-load function, encounters but one curve (designated by $z$) on its way from the pump to its arrival at the suction side thereof, which curve cannot be avoided, since the liquid must describe a closed curve. There is obtained, therefore, the minimum of curves—and, consequently, the minimum of resistance. The second requirement is that, at throwing on of the speed, the quantity of oil drawn upon for power, as well as the quantity of oil performing no work, should be as small as possible. Supposing that the first (lowest) speed is to be thrown in, the smaller pump $c$ drives the oil, sucked up by it, into the pressure channel $j$, so that the oil from the pump to the motor $e$ (which constitutes, at one end, the sole communication between the two canals) undergoes, during its free movement, but one change of direction, as indicated by $x$. If there were many curves and transverses to be passed, the resistance would become so high as to materially reduce the efficiency of the gear, especially in power-vehicles where a high number of revolutions is especially desirable. The oil in leaving the differential (motor or motors, $e$) flows away tangentially, and in leaving the suction canal or chamber $k$ again encounters only a single change of direction—designated by $y$,—in order to return to the pump.

The pumps and motors may be of any suitable construction. I have shown rotary parts having the vanes, $b'$ $c'$, $d'$, slidably fitted thereto in any usual manner.

In throwing in a higher, or the highest, speed, it is just so much more important that the entire quantity of oil should pass through no curves or transverse canals, since the high number of revolutions of the motor or motors must be assured. The speed of the oil is about five times that of the motor, and since, in gears for power purposes, this speed cannot be reduced—because, otherwise, the apparatus would be too large to be contained in a vehicle chassis—it is absolutely necessary to provide the canal guides with the smallest possible number of curves; to do differently, would mean great resistances, reducing the efficiency so as to leave the gear out of favorable consideration upon comparison with a toothed gear. Upon throwing in the highest speed, the entire quantity of oil traverses the path previously described—that is, upon leaving the pumps until arrival at the differential, it meets but one deviation. For the first time, therefore, a gear is provided which, at every speed as well as at the no-load function, there is but one change of direction of the liquid, and one which may be used, for power vehicles especially, with the highest possible efficiency.

What I claim is:

1. A liquid power transmission mechanism comprising a unitary casing, a rotary motor and a rotary pump within said casing in such position that the axis of each is perpendicular to a plane containing the axis of the other, said casing being provided with two substantially parallel conduits connecting the discharge of the pump with the inlet of the motor and the discharge of the motor with the inlet of the pump, communicating at their ends adjacent the motor with the passage for fluid through the motor and lying in the same plane with said passage, and communicating at their opposite ends with the pump through two branches common to both conduits, which passages communicate with the passage for liquid through the pump and lie in the same plane therewith, and a valve for each branch governing the communication between it and both conduits.

2. A liquid power transmission mechanism comprising a unitary casing, a rotary motor and a rotary pump within said casing in such position that the axis of each is perpendicular to a plane containing the axis of the other, said casing being provided with two substantially parallel conduits connecting the discharge of the pump with the inlet of the motor and the discharge of the motor with the inlet of the pump, communicating at their ends adjacent the motor with the passage for fluid through the motor and lying in the same plane with said passage, and communicating at their opposite ends with the pump through two branches common to both conduits, which passages communicate with the passage for liquid through the pump and lie in the same plane therewith, and a valve for each branch governing the communication between it and both conduits, the passage of the valves and the passage through the pumps controlled thereby having the same cross-section.

3. A liquid power transmission mechanism comprising a unitary casing, a rotary motor and a rotary pump within said casing in such position that the axis of each is perpendicular to a plane containing the axis of the other, said casing being provided with two substantially parallel conduits connecting the discharge of the pump with the inlet of the motor and the discharge of the motor with the inlet of the pump, communicating at their ends adjacent the motor with the passage for fluid through the motor and lying in the same plane with said passage, and communicating at their opposite ends with the pump through two branches common to both conduits, which passages communicate with the passage for liquid through the pump and lie in the same plane therewith, and a valve for each branch governing the communication between it and both conduits, the passage of the valves and the passage through the pumps controlled thereby having the same cross-section, whereby the liquid stream upon passing the valves retains the same cross-sectional area, as when passing the pumps.

In testimony whereof, I have signed my name to this specification in the presence of two subscribing witnesses.

HUGO LENTZ.

Witnesses:
 JAKOB KRAUS,
 A. O. TITTMANN.